(12) United States Patent
Ling (10) Patent No.: US 8,958,330 B2
(45) Date of Patent: Feb. 17, 2015

(54) DE-RATE MATCHING METHOD AND DEVICE FOR DOWNLINK TRAFFIC CHANNEL IN LONG TERM EVOLUTION

(75) Inventor: Xiaojing Ling, Shenzhen (CN)

(73) Assignee: ZTE Corporation (CN)

( * ) Notice: Subject to any disclaimer, the term of this patent is extended or adjusted under 35 U.S.C. 154(b) by 169 days.

(21) Appl. No.: 13/695,945

(22) PCT Filed: May 5, 2011

(86) PCT No.: PCT/CN2011/073699
§ 371 (c)(1),
(2), (4) Date: Nov. 2, 2012

(87) PCT Pub. No.: WO2011/137749
PCT Pub. Date: Nov. 10, 2011

(65) Prior Publication Data
US 2013/0051354 A1     Feb. 28, 2013

(30) Foreign Application Priority Data

May 5, 2010  (CN) .......................... 2010 1 0165763

(51) Int. Cl.
*H04W 28/22*     (2009.01)
*H04L 1/00*      (2006.01)
*H04W 28/06*     (2009.01)
*H04W 72/00*     (2009.01)

(52) U.S. Cl.
CPC .............. *H04W 28/06* (2013.01); *H04W 28/22* (2013.01); *H04W 72/00* (2013.01); *H04W 28/065* (2013.01)
USPC ........... 370/252; 370/329; 370/441; 455/450; 714/E11.032

(52) U.S. Cl.
CPC .............. *H04L 1/0067* (2013.01); *H04L 1/005* (2013.01); *H04L 1/0066* (2013.01); *H04L 1/0061* (2013.01); *H04L 1/0071* (2013.01);

(Continued)

(58) Field of Classification Search
None
See application file for complete search history.

(56) References Cited

U.S. PATENT DOCUMENTS

| 2005/0053088 | A1* | 3/2005 | Cheng et al. ................... 370/464 |
| 2006/0107165 | A1* | 5/2006 | Murata et al. .................. 714/748 |
| 2009/0158008 | A1* | 6/2009 | Hepler et al. ................... 712/29 |
| 2011/0145670 | A1* | 6/2011 | Fan et al. ....................... 714/748 |

FOREIGN PATENT DOCUMENTS

| CN | 101388751 | 3/2009 |
| CN | 101510781 | 8/2009 |
| CN | 101674161 | 3/2010 |
| WO | 2009014374 | 1/2009 |

OTHER PUBLICATIONS

International Search Report for International Patent Application No. PCT/CN2011/073699, mailed Aug. 4, 2011.
3GPP TS36.212 V9.1.0: Evolved Universal Terrestrial Radio Access (E-UTRA); Multiplexing and channel coding (Release 9) Mar. 30, 2010.
3GPP TS 25.212 V9.2.0: Multiplexing and channel coding (FDD) (Release 9) Mar. 17, 2010).

*Primary Examiner* — Chi H Pham
*Assistant Examiner* — Shick Hom
(74) *Attorney, Agent, or Firm* — McAndrews, Held & Malloy, Ltd.

(57) ABSTRACT

The present invention discloses a de-rate matching method and device for a downlink traffic channel in a Long Term Evolution (LTE). The method comprises: at a terminal side, dividing a received Transport Block (TB) of a downlink traffic channel, i.e., Physical Downlink Shared Channel (PDSCH), into a plurality of different code blocks; for the first code block, de-rate matching of data is implemented by a segmented copy method; and for the other code blocks, de-rate matching is implemented by a table lookup method. By applying the method and device provided in the embodiments of the present invention, the execution speed of the de-rate matching can be improved, and the overall processing speed of the downlink traffic channel can be improved.

8 Claims, 4 Drawing Sheets

DE-RATE MATCHING METHOD AND DEVICE FOR DOWNLINK TRAFFIC CHANNEL IN LONG TERM EVOLUTION

FIELD OF THE INVENTION

The present invention relates to the field of mobile communications, in particular to a de-rate matching method and device for a downlink traffic channel in Long Term Evolution (LTE) in the field of wireless mobile communications.

BACKGROUND OF THE INVENTION

As an evolution of 3G technology, the LTE improves and enhances the 3G air access technology. A new generation wireless network based on Orthogonal Frequency Division Multiplexing (OFDM) and Multiple-Input Multiple-Output (MIMO) technologies can provide a peak rate of 100 Mbit/s in downlink and 50 Mbit/s in uplink under a spectrum bandwidth of 20 MHz, thereby improving the performance of cell edge users, increasing the cell capacity and spectrum utilization ratio, and reducing the system delay. In terms of system architecture, the LTE makes an evolution on the basis of the original system architecture of 3rd Generation Partnership Project (3GPP), and integrates and simplifies functions of a NodeB, a Radio Network Controller (RNC) and a Core Network (CN). In the system architecture of the LTE, the system equipment consists of two parts: an Evolved NodeB (eNB) and an Evolved Packet Core (EPC).

Figure 1:
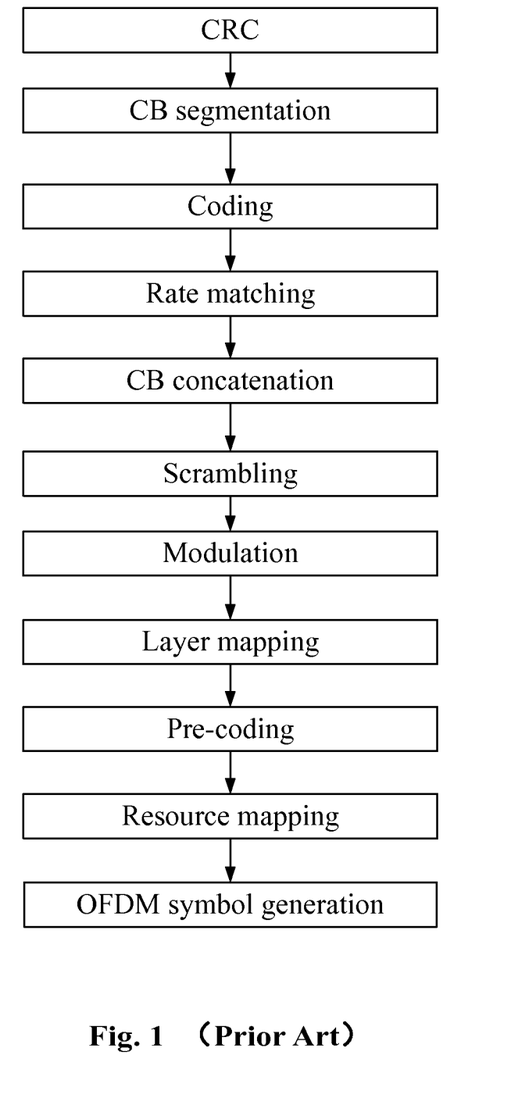
FIG. 1 is a processing flow diagram at a sending end of the downlink traffic channel in the conventional art.
Figure 2:
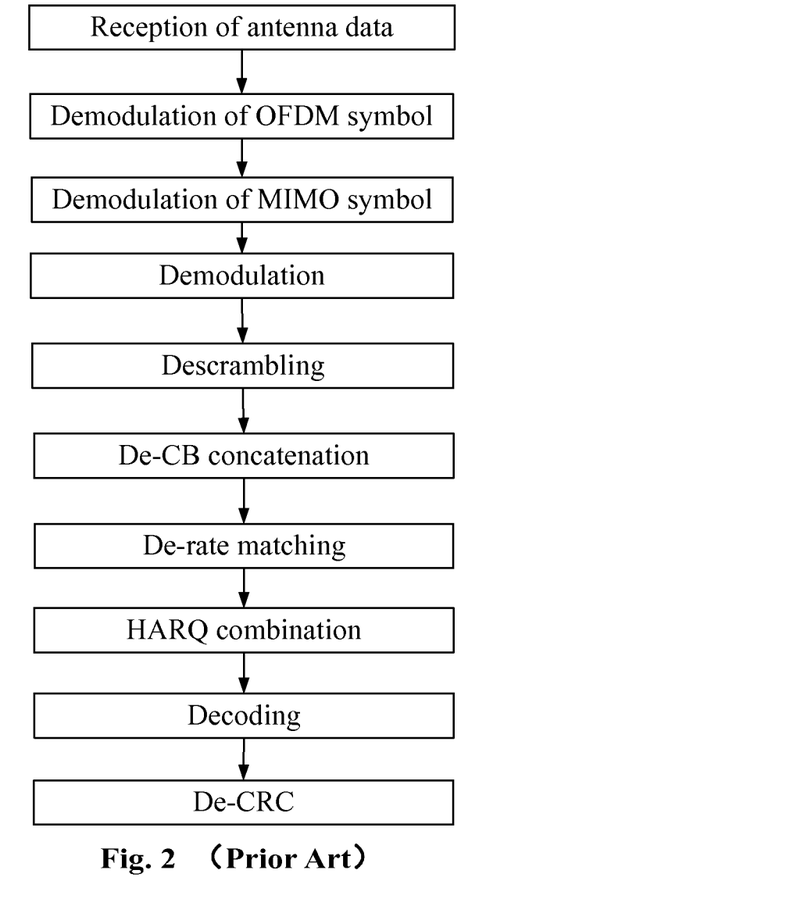
FIG. 2 is a processing flow diagram at a receiving end of the downlink traffic channel in the conventional art.

For a downlink traffic channel in the LTE, the sending flow at the eNB side is as shown in FIG. 1 and comprises: Cyclic Redundancy Check (CRC), code block segmentation, Turbo coding, rate matching, code block concatenation, scrambling, modulation, layer mapping, pre-coding, resource mapping and OFDM symbol generation; the receiving flow at the UE side is as shown in FIG. 2 and comprises: reception of antenna data, demodulation of OFDM symbol, demodulation of MIMO symbol, demodulation, descrambling, de-code-block concatenation, de-rate matching, Hybrid Automatic Repeat Request (HARQ) combination and channel decoding or the like.

Each code block corresponds to one rate matching module, and the input of each rate matching is the output of the Turbo coding module, i.e., parallel three branches: $d_k^{(0)}$, $d_k^{(1)}$ and $d_k^{(2)}$ (k=0, . . . , K−1). In terms of structure, the rate matching module comprises: three interleaver sub-modules for respectively processing the three branches, one bit collection sub-module for summarization and one bit selection and reduction sub-module. Three branches of data are read-in in lines by respective independent sub-block interleavers, redundant nulls are filled in the front of the interleaving matrix, and data are read-out in columns after being exchanged in columns. Then, the three branches of interleaved data are summarized to the bit collection sub-module, the first branch of data is input in turn, and the second branch of data and the third branch of data are placed alternately. Finally, from k0, the redundant nulls in the data in the bit collection sub-module are skipped, and E valid data are selected in turn as the output of the rate matching.

As an inverse process of the rate matching, the de-rate matching comprises three processes: de-puncturing, de-interleaving and de-repeating, wherein the de-repeating is an optional process. The specific implementations of the above three processes are as follows:

de-puncturing: nulls taken out during the bit selection and reduction process of the rate matching are filled into the valid data;

de-interleaving: it is an inverse process of the sub-block interleaving;

de-repeating: the rate matching starts from k0, if the valid data after k0 cannot fill the length E of $e_k$, the rate matching will cycle to start from the start part until $e_k$ is filled.

As the length E of $e_k$ is determined according to the situation of resource allocation, there may be not integral number of times of cycle when $e_k$ is generated, therefore, during the implementation, it is necessary to acquire the number of times of cycle of each radio frame for generation of $e_k$ during the rate matching (obtained by E/Nc, wherein Nc refers to the number of valid data after k0) and information about the remaining bits after integral number of times of cycle. Then, each piece of soft information is averaged according to the cycle period, and then the averaged data is de-punctured or de-interleaved.

In the conventional art, the de-rate matching is an important processing process for downlink traffic channel. In the current technologies, there are very few de-rate matching methods for a downlink traffic channel at the terminal side in the LTE. According to the present de-rate matching method related to the 3G and the LTE, the received code blocks are de-rate matched in only one manner, the method is relatively single and is lack of flexibility, and the complexity of implementation is relatively high.

SUMMARY OF THE INVENTION

The present invention provides de-rate matching method and device for a downlink traffic channel in the LTE, which solve the problem of low speed of the de-rate matching caused as the de-rate matching for a downlink traffic channel in the LTE in the conventional art is unable to perform de-rate matching for a data packet (also referred to as transport block, TB) according to the feature of each code block in the received data.

An embodiment of the present invention provides a de-rate matching method for a downlink traffic channel in the LTE, comprising:

receiving a Transport Block (TB), which comprises a first branch of data, a second branch of data and valid data of a third branch of data that are Turbo coded at a system side, of a Physical Downlink Shared Channel (PDSCH), and dividing the received TB into a plurality of Code Blocks (CBs), and executing following operations:

for a first CB of the TB:

determining nulls required to be added to restore valid data in the first CB into a data length, which is the data length after a bit collection at the system side, and determining a position relationship between the nulls required to be added and the valid data in the first CB;

restoring the valid data in the first CB into the data length, which is the data length after the bit collection at the system side, according to the valid data in the first CB and the position relationship between the nulls and the valid data; and de-interleaving the restored valid data in the first CB;

for each non-first CB other than the first CB:

determining valid data lengths of the first branch of data, the second branch of data and the third branch of data in each non-first CB after the system side divides the TB into the plurality of CBs, reading valid data in corresponding lengths from the non-first CB according to the valid data lengths of the three branches of data in each non-first CB, and de-puncturing, de-interleaving or de-repeating the read valid data.

An embodiment of the present invention also provides a de-rate matching device for a downlink traffic channel in an LTE, comprising:

a CB dividing unit, configured to receive a TB of a PDSCH and divide the received TB into a plurality of CBs, wherein the TB comprises a first branch of data, a second branch of data and valid data of a third branch of data that are Turbo coded at a system side;

a first CB processing unit, configured to: when a received CB is the first CB of the TB, determine nulls required to be added to restore valid data in the first CB into a data length, which is the data length after a bit collection at the system side, and determine a position relationship between the nulls required to be added and the valid data in the first CB; restore the valid data in the first CB into the data length, which is the data length after the bit collection at the system side, according to the position relationship between the nulls and the valid data and the valid data in the first CB; and de-interleave the restored valid data in the first CB; and a non-first CB processing unit, configured to: for each non-first CB other than the first CB, determine valid data lengths of the first branch of data, the second branch of data and the third branch of data in each non-first CB after the system side divides the TB into the plurality of CBs, read valid data in corresponding lengths from the non-first CB according to the valid data lengths of the three branches of data in each non-first CB, and de-puncture, de-interleave or de-repeat the read valid data.

According to the method and device provided in the present invention, the received TB of a downlink traffic channel, i.e., PDSCH, is divided into a plurality of CBs, for the first CB, de-rate matching of data is achieved by a segmented copy method; and, for the other CBs, de-rate matching is achieved by a table lookup method, the execution speed of de-rate matching can be improved, and the overall processing speed of the downlink traffic channel can be improved.

DETAILED DESCRIPTION OF THE EMBODIMENTS

The embodiments of the present invention provide a de-rate matching method and device for a downlink traffic channel in the LTE, and the method comprises: a terminal receives a TB, which comprises a first branch of data, a second branch of data and valid data of a third branch of data, of a downlink traffic channel, i.e., PDSCH, divides the received TB into a plurality of CBs, and executes:

for the first CB of the TB: determining nulls required to be added to restore valid data in the first CB into a data length, which is the data length after a bit collection at the system side, and determining a position relationship between the nulls required to be added and the valid data in the first CB; restoring the valid data in the first CB into the data length, which is the data length after the bit collection at the system side, according to the valid data in the first CB and the position relationship between the nulls and the valid data; and de-interleaving the restored valid data in the first CB;

for each non-first CB other than the first CB: determining valid data lengths of the first branch of data, the second branch of data and the third branch of data in each non-first CB after the system side divides the TB into the plurality of CBs, reading valid data in corresponding lengths from the non-first CB according to the valid data lengths of the three branches of data in each non-first CB, and de-puncturing, de-interleaving or de-repeating the read valid data.

Figure 3:
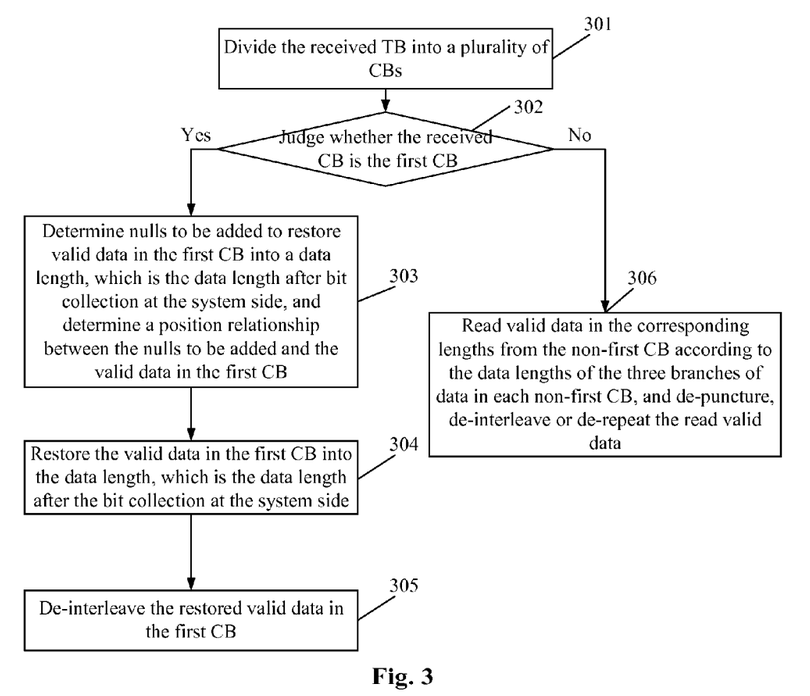
FIG. 3 is a flow chart of a de-rate matching method for a downlink traffic channel in the LTE in an embodiment of the present invention.

Embodiment 1: as shown in FIG. 3, an embodiment of the present invention provides a de-rate matching method for a downlink traffic channel in the LTE, specifically comprising the following steps.

Step 301: An LTE terminal receives the TB of a PDSCH, and divides the received TB into a plurality of CBs.

At the system side, an input of each rate matching is an output of a Turbo coding module, i.e., parallel three branches: the first branch of data ($d_k^{(0)}$), the second branch of data ($d_k^{(1)}$) and the third branch of data ($d_k^2$) (k=0, ..., K−1). The output of the rate matching is the valid data after the three branches of data is interleaved, therefore, the TB received by the terminal side comprises the first branch of data, the second branch of data and the valid data of the third branch of data that are Turbo coded at the system side.

Step 302: It is judged whether the received CB is the first CB of the TB (it can be called as first CB for short), if so, turn to Step 303; if not, turn to Step 306.

In the embodiment of the present invention, after the TB is divided into a plurality of CBs, whether the CB is the first CB is judged according to whether an index of the received data is 0.

Step 303: When the received CB is the first CB of the TB, nulls required to be added to restore valid data in the first CB into a data length, which is the data length after the bit collection at the system side, are determined, and a position relationship between the nulls required to be added and the valid data in the first CB is determined.

Step 304: the valid data in the first CB are restored into the data length, which is the data length after the bit collection at the system side, according to the position relationship between the nulls and the valid data and the valid data in the first CB.

Wherein, the specific implementation method of restoring the valid data in the first CB into the data length, which is the data length after the bit collection at the system side, according to the position relationship between the nulls and the valid data and the valid data in the first CB comprises:

filling the nulls in preset data according to the position relationship between the nulls and the valid data, wherein the length of an array is the data length of the CB after the bit collection, if the length of each branch of data is k2, the length of the array is three times of k2;

starting from a specified position, in turn copying data in the first CB to positions available after filling the nulls into a first array, wherein the specified position is a begin position of the valid data selected by bit reduction and selection during the rate matching.

Step 305: The restored valid data in the first CB are de-interleaved.

The specific implementation method of this step comprises:

de-interleaving the front k2 data in the first array, removing redundant nulls added during sub-block interleaving to obtain the valid data of the de-rate matched first branch of data, wherein k2 refers to the sum of the number of valid data and nulls in one branch during sub-block interleaving;

de-interleaving the rear 2*k2 data, and separating the data by parity bit to obtain the valid data of the de-rate matched second branch of data and third branch of data.

Step 306: When the received CB is a non-first CB other than the first CB (it can be called as other CBs for short, in the embodiment, it can be understood that one TB comprises one first CB and a plurality of other CBs), valid data lengths of the first branch of data, the second branch of data and the third branch of data in each non-first CB after the system side divides the TB into the plurality of CBs are determined, valid data in the corresponding lengths are read from the non-first CB according to the valid data lengths of the three branches of data in each non-first CB, and the read valid data are de-punctured, de-interleaved or de-repeated.

Wherein, the step of determining the valid data lengths of the first branch of data, the second branch of data and the third branch of data in the non-first CB after the system side divides the TB into the plurality of CBs comprises:

acquiring a corresponding lookup table stored after the system side divides the TB into the plurality of CBs, wherein the lookup table stores the valid data lengths of the first branch of data, the second branch of data and the third branch of data in each non-first CB, and the lookup table comprises a first branch lookup table and a second and third branch lookup table;

if k0 is less than k2 and k0 is in the first branch of data, acquiring, from the first branch lookup table, the valid data length of the first branch of data in each non-first CB after the system side divides the TB into the plurality of CBs, wherein k0 refers to a begin position of valid data selected in the bit reduction and selection by the rate matching module, and k2 refers to a data sum of valid data and redundant nulls in one branch during sub-block interleaving;

if k0 is greater than k2 and k0 is in the second branch of data or the third branch of data, acquiring, from the second and third branch lookup table, the valid data lengths of the second branch of data and the third branch of data in each non-first CB after the system side divides the TB into the plurality of CBs.

During the specific implementation, the method shown in FIG. 3 can be implemented in the following way:

first, dividing the received TB, and judging whether the CB to be de-rate matched is the first CB of the TB;

if the CB is the first CB, calculating absolute positions of nulls in the first branch of data and the second branch of data (nulls added during CB segmentation and nulls added during sub-block interleaving), and positions of nulls added during the sub-block interleaving of the third branch of data;

arraying the positions of the nulls in the three branches in an ascending order, to obtain a new null position array Abs_NullPosition[ ];

finding out the minimum value BeginIndex greater than k0 in the array Abs_NullPosition[ ], wherein k0 refers to the begin position of valid data selected in the bit reduction and selection by the rate matching module at the system side;

setting an initial value of an array TempBuff[ ], the length of which is 3*k2, as 0, wherein k2 refers to the sum of the number of valid data and nulls in one branch during sub-block interleaving;

storing data received during the de-rate matching (i.e., data in the CB) in an array MergedBuff[ ];

and then, starting from the position k0, in turn copying data in the CB from a specified position to positions available after filling the nulls into the first array, the specific implementation way comprises:

according to segments such as k0~Abs_NullPosition[BeginIndex]−1, Abs_NullPosition[BeginIndex]+1~Abs_NullPosition[BeginIndex+1], . . . , copying data in MergedBuff[ ] from the begin position, and assigning the data to TempBuff[ ] until data in MergedBuff[ ] are copied completely;

de-interleaving the front k2 data in TempBuff[ ], remove redundant nulls added during sub-block interleaving to obtain valid data of the de-rate matched first branch of system bits, and storing the valid data in an array DeRateMatchedBuff1[ ];

de-interleaving the rear 2*k2 data in TempBuff[ ], and storing the valid data in an array DeRateMatchedBuff23[ ]; separating the data in the array DeRateMatchedBuff23 [ ] by parity bit to obtain the de-rate matched second branch of data and third branch of data.

For other CBs, de-rate matching is achieved by a table lookup method, this table is a table after CB segmentation specified in 36212 Protocol, K+ and K_after CB segmentation are obtained, and then data corresponding to the two lengths are read from a memory for storing data in CBs according to K+ and K_, there are total 188 kinds of lengths for segmented CBs (the lookup table comprises: a first branch lookup table and a second and third branch lookup table).

The specific implementation method for table lookup method in the embodiment of the present invention can be as follows:

first, judging the value of k0, wherein k0 (formula for calculating k0 is:

$$k_0 = R \cdot \left(2 \cdot \left\lceil \frac{N_{cb}}{8R} \right\rceil \cdot rv_{idx} + 2\right)$$

refers to the begin position of valid data selected in the bit reduction and selection by the rate matching module, R refers to the number of rows of the exchange matrix, $$N_{cb} = \min\left(\left\lfloor \frac{N_{IR}}{C} \right\rfloor, K_w\right),$$

wherein $N_{IR}$ refers to the size of the soft buffer of the TB, which is notified by an upper-layer signaling; C refers to the number of columns of the exchange matrix; $K_w$ refers to the sum of the number of three branches of valid code elements and nulls in the bit collection; and $rv_{idx}$ refers to the redundancy version transmitted here, which is controlled by the upper layer, k2 refers to the sum of the number of valid data and nulls in one branch during sub-block interleaving;

if k0 is less than k2, determining that k0 is in the first branch (CurBranch=1);

if k0 is greater than k2, determining that k0 is in the second or third branch (CurBranch=2);

storing the received data during the de-rate matching in the array MergedBuff[ ];

then, judging whether the valid data in the array MergedBuff[ ] after k0 are greater than the number E of output bits of the rate matching:

(1) if the valid data after k0 are greater than or equal to the number E of the output bits of the rate matching, moreover, if k0 is in the first branch and the valid data in the first branch after k0 are greater than or equal to E, then processing the first branch of data only;

if k0 is in the first branch and the valid data in the first branch after k0 is less than E, then processing the first branch of data first, and then processing the second and third branches of data;

if k0 is in the second or third branch, directly processing from k0;

(2) if the valid data after k0 are less than the number E of the output bits of the rate matching, moreover, if k0 is in the first branch and the number E of the bits that can be borne by rate matching is greater than 3*k2, de-repeating first, then processing the first branch of data, then processing the second and third branches of data, and finally processing data in the first branch before k0;

if k0 is in the first branch and the number E of the bits that can be borne by rate matching is less than or equal to 3*k2, processing the first branch of data first, then processing the second and third branches of data, and finally processing data in the first branch before k0;

if k0 is in the second or third branch and the number E of the bits that can be borne by rate matching is greater than 3*k2, de-repeating first, then processing the second and third branches of data, then processing the first branch of data, and finally processing data in the second and third branches before k0;

if k0 is in the second or third branch and the number E of the bits that can be borne by rate matching is less than or equal to 3*k2, processing the second and third branches of data first, then processing the first branch of data, and finally processing data in the second and third branches before k0.

Figure 4:
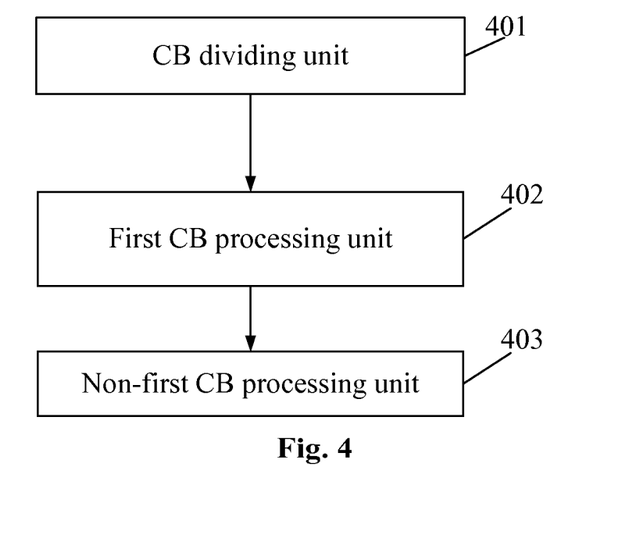
FIG. 4 is a structure diagram of a de-rate matching device for a downlink traffic channel in the LTE in an embodiment of the present invention.

As shown in FIG. 4, an embodiment also provides a de-rate matching device for a downlink traffic channel in the LTE, comprising:

a CB dividing unit 401, configured to receive the TB of a PDSCH and divide the received TB into a plurality of CBs, wherein the TB comprises a first branch of data, a second branch of data and valid data of a third branch of data that are Turbo coded at a system side;

a first CB processing unit 402, configured to: when the received CB is the first CB of the TB, determine nulls required to be added to restore valid data in the first CB into a data length, which is the data length after bit collection at the system side, and determine a position relationship between the nulls required to be added and the valid data in the first CB; restore the valid data in the first CB into the data length, which is the data length after the bit collection at the system side, according to the position relationship between the nulls and the valid data and the valid data in the first CB; de-interleave the restored valid data in the first CB;

a non-first CB processing unit 403, configured to: for each non-first CB other than the first CB, determine the valid data lengths of the first branch of data, the second branch of data and the third branch of data in each non-first CB after the system side divides the TB into the plurality of CBs, read valid data in the corresponding lengths from the non-first CB according to the data lengths of the three branches of data in each non-first CB, and de-puncture, de-interleave or de-repeat the read valid data.

In an embodiment of the present invention, the mode that the first CB processing unit 402 restores the valid data in the first CB into the data length, which is the data length after the bit collection at the system side, according to the position relationship between the nulls and the valid data and the valid data in the first CB comprises:

filling the nulls in preset data according to the position relationship between the nulls and the valid data, wherein a length of an array is the data length of the CB after the bit collection;

starting from a specified position, in turn copying data in the first CB to positions, which are available after filling the nulls into a first array, wherein the specified position is a begin position of valid data selected by bit reduction and selection during rate matching.

Besides, the mode that the first CB processing unit 402 de-interleaves the restored valid data in the first CB comprises:

de-interleaving front k2 data in the first array, and removing redundant nulls added during sub-block interleaving to obtain the valid data of de-rate matched first branch of data, wherein k2 refers to a sum of the number of valid data and nulls in one branch during sub-block interleaving; and de-interleaving rear 2*k2 data in the first array, and separating the data by parity bit to obtain the valid data of the de-rate matched second branch of data and third branch of data.

The mode that the non-first CB processing unit 403 determines the valid data lengths of the first branch of data, the second branch of data and the third branch of data in the non-first CB after the system side divides the TB into the plurality of CBs comprises:

acquiring a corresponding lookup table, which is stored by the system side after dividing the TB into the plurality of CBs, wherein the lookup table stores the valid data lengths of the first branch of data, the second branch of data and the third branch of data in the non-first CB, and the lookup table comprises a first branch lookup table and a second and third branch lookup table;

if k0 is less than k2 and k0 is in the first branch of data, acquiring, from the first branch lookup table, the valid data length of the first branch of data in each non-first CB after the system side divides the TB into the plurality of CBs, wherein k0 refers to a begin position of valid data selected in a bit reduction and selection by a rate matching module, and k2 refers to a sum of the number of valid data and redundant nulls in one branch during sub-block interleaving;

if k0 is greater than k2 and k0 is in the second branch of data or the third branch of data, acquiring, from the second and third branch lookup table, the valid data lengths of the second branch of data and the third branch of data in each non-first CB after the system side divides the TB into the plurality of CBs.

According to the method and device provided in the embodiments of the present invention, two different de-rate matching implementation methods are employed, therefore the complexity of the system implementation is decreased effectively, and the method and device are simple and feasible. The de-rate matched data of the first CB are fully utilized for table lookup to find the position of the valid data greater than k0, the time required for de-redundancy and de-interleaving during the de-rate matching is reduced, three branches of de-rate matched data are directly obtained by table lookup, the time for de-rate matching is reduced. Moreover, implementation by means of software makes the implementation way flexible, the extension convenient and the change easy.

The method in the present invention is not limited to the embodiments of the present invention, for those skilled in the art, the present invention may have other implementation ways according to the technical solutions of the present invention, and these implementation ways should also be included within the technical innovation scope of the present invention. Of course, for those skilled in the art, the present invention may have various alternations and changes within the scope of the present invention. In this way, if these modifications and changes are made within the scope defined by the claims of the present invention or equivalent technologies thereof, these alternations and changes should be included within the protection scope of the present invention.

What is claimed is:

1. A de-rate matching method for a downlink traffic channel in a Long Term Evolution (LTE), comprising:
receiving a Transport Block (TB), which comprises a first branch of data, a second branch of data and valid data of a third branch of data that are Turbo coded at a system side, of a Physical Downlink Shared Channel (PDSCH), and dividing the received TB into a plurality of Code Blocks (CBs), and executing following operations:
for a first CB of the TB:
determining nulls required to be added to restore valid data in the first CB into a data length, which is the data length after a bit collection at the system side, and determining a position relationship between the nulls required to be added and the valid data in the first CB;
restoring the valid data in the first CB into the data length, which is the data length after the bit collection at the system side, according to the valid data in the first CB and the position relationship between the nulls and the valid data; and
de-interleaving the restored valid data in the first CB;
for each non-first CB other than the first CB:
determining valid data lengths of the first branch of data, the second branch of data and the third branch of data in each non-first CB after the system side divides the TB into the plurality of CBs, reading valid data in corresponding lengths from the non-first CB according to the valid data lengths of the three branches of data in each non-first CB, and de-puncturing, de-interleaving or de-repeating the read valid data.

2. The method according to claim 1, wherein the step of determining the valid data lengths of the first branch of data, the second branch of data and the third branch of data in each non-first CB after the system side divides the TB into the plurality of CBs comprises:
acquiring a corresponding lookup table, which is stored by the system side after dividing the TB into the plurality of CBs, wherein the lookup table stores the valid data lengths of the first branch of data, the second branch of data and the third branch of data in each non-first CB, and the lookup table comprises a first branch lookup table and a second and third branch lookup table;
if k0 is less than k2 and k0 is in the first branch of data, acquiring, from the first branch lookup table, the valid data length of the first branch of data in each non-first CB after the system side divides the TB into the plurality of CBs, wherein k0 refers to a begin position of valid data selected in a bit reduction and selection by a rate matching module, and k2 refers to a sum of the number of valid data and redundant nulls in one branch during sub-block interleaving;
if k0 is greater than k2 and k0 is in the second branch of data or the third branch of data, acquiring, from the second and third branch lookup table, the valid data lengths of the second branch of data and the third branch of data in each non-first CB after the system side divides the TB into the plurality of CBs.

3. The method according to claim 1, wherein the step of restoring the valid data in the first CB into the data length, which is the data length after the bit collection at the system side, according to the valid data in the first CB and the position relationship between the nulls and the valid data comprises:
filling the nulls in preset data according to the position relationship between the nulls and the valid data, wherein a length of an array is the data length of the CB after the bit collection;
starting from a specified position, in turn copying data in the first CB to positions, which are available after filling the nulls into a first array, wherein the specified position is a begin position of valid data selected by bit reduction and selection during rate matching.

4. The method according to claim 3, wherein the step of de-interleaving the restored valid data in the first CB comprises:
de-interleaving front k2 data in the first array, and removing redundant nulls added during sub-block interleaving to obtain the valid data of de-rate matched first branch of data, wherein k2 refers to a sum of the number of valid data and nulls in one branch during sub-block interleaving; and
de-interleaving rear 2*k2 data in the first array, and separating the data by parity bit to obtain the valid data of the de-rate matched second branch of data and third branch of data.

5. A de-rate matching device for a downlink traffic channel in an LTE, comprising:
a CB dividing unit, configured to receive a TB of a PDSCH and divide the received TB into a plurality of CBs, wherein the TB comprises a first branch of data, a second branch of data and valid data of a third branch of data that are Turbo coded at a system side;
a first CB processing unit, configured to: when a received CB is the first CB of the TB, determine nulls required to be added to restore valid data in the first CB into a data length, which is the data length after a bit collection at the system side, and determine a position relationship between the nulls required to be added and the valid data in the first CB; restore the valid data in the first CB into the data length, which is the data length after the bit collection at the system side, according to the position relationship between the nulls and the valid data and the valid data in the first CB; and de-interleave the restored valid data in the first CB; and
a non-first CB processing unit, configured to: for each non-first CB other than the first CB, determine valid data lengths of the first branch of data, the second branch of data and the third branch of data in each non-first CB after the system side divides the TB into the plurality of CBs, read valid data in corresponding lengths from the non-first CB according to the valid data lengths of the three branches of data in each non-first CB, and de-puncture, de-interleave or de-repeat the read valid data.

6. The device according to claim 5, wherein a mode that the non-first CB processing unit determines the valid data lengths of the first branch of data, the second branch of data and the third branch of data in the non-first CB after the system side divides the TB into the plurality of CBs comprises:
acquiring a corresponding lookup table, which is stored by the system side after dividing the TB into the plurality of CBs, wherein the lookup table stores the valid data lengths of the first branch of data, the second branch of data and the third branch of data in the non-first CB, and the lookup table comprises a first branch lookup table and a second and third branch lookup table;
if k0 is less than k2 and k0 is in the first branch of data, acquiring, from the first branch lookup table, the valid data length of the first branch of data in each non-first CB after the system side divides the TB into the plurality of CBs, wherein k0 refers to a begin position of valid data selected in a bit reduction and selection by a rate matching module, and k2 refers to a sum of the number of valid data and redundant nulls in one branch during sub-block interleaving;

if k0 is greater than k2 and k0 is in the second branch of data or the third branch of data, acquiring, from the second and third branch lookup table, the valid data lengths of the second branch of data and the third branch of data in each non-first CB after the system side divides the TB into the plurality of CBs.

7. The device according to claim 5, wherein a mode that the first CB processing unit restores the valid data in the first CB into the data length, which is the date length after the bit collection at the system side, according to the position relationship between the nulls and the valid data and the valid data in the first CB comprises:

filling the nulls in preset data according to the position relationship between the nulls and the valid data, wherein a length of an array is the data length of the CB after the bit collection;

starting from a specified position, in turn copying data in the first CB to positions, which are available after filling the nulls into a first array, wherein the specified position is a begin position of valid data selected by bit reduction and selection during rate matching.

8. The device according to claim 5, wherein a mode that the first CB processing unit de-interleaves the restored valid data in the first CB comprises:

de-interleaving front k2 data in the first array, and removing redundant nulls added during sub-block interleaving to obtain the valid data of de-rate matched first branch of data, wherein k2 refers to a sum of the number of valid data and nulls in one branch during sub-block interleaving; and de-interleaving rear 2*k2 data in the first array, and separating the data by parity bit to obtain the valid data of the de-rate matched second branch of data and third branch of data.

* * * * *